United States Patent [19]

Lindstrom

[11] 4,049,878
[45] Sept. 20, 1977

[54] ELECTROCHEMICAL BATTERY

[76] Inventor: Olle Birger Lindstrom, Lorensviksv. 14, 183 63 Taby, Sweden

[21] Appl. No.: 685,647

[22] Filed: May 12, 1976

[30] Foreign Application Priority Data

May 12, 1975  Sweden ............................... 7505447

[51] Int. Cl.² ............................................ H01M 2/40
[52] U.S. Cl. ........................................ 429/18; 429/38; 429/70
[58] Field of Search ........................ 429/18, 38, 70, 73

[56] References Cited

U.S. PATENT DOCUMENTS

| 944,079 | 12/1909 | Decker | 429/70 |
|---|---|---|---|
| 1,380,770 | 6/1921 | Carpenter | 429/73 |
| 3,773,561 | 11/1973 | Bjorkman | 429/18 |
| 3,806,370 | 4/1974 | Nischik | 429/18 |

*Primary Examiner*—Donald L. Walton
*Attorney, Agent, or Firm*—Burns, Doane, Swecker & Mathis

[57] ABSTRACT

An electrochemical battery including a plurality of modules interconnected electrically in series. Each module comprises a plurality of cells connected electrically in parallel. Each cell includes positive and negative electrodes. An electrolyte supply channel is individually connected to electrolyte spaces in each cell to supply electrolyte thereto. The cells of each module are fluidly interconnected at their lower ends in parallel by means of cross-channels. Optionally, these cells may also be fluidly interconnected at their upper ends in parallel by additional cross-channels.

3 Claims, 2 Drawing Figures

ELECTROCHEMICAL BATTERY

BACKGROUND AND OBJECTS

The present invention relates to electrochemical batteries.

Many types of Chemoelectric batteries such as fuel cell batteries, metal air batteries, and advanced versions of established batteries like the alkaline accumulator, the lead acid battery, etc., are frequently built in the form of a pile or in so-called filterpress configuration. Such a pile is frequently built of elements with a preferably planar form which are stacked and joined to each other so as to produce a continuous pile. The pile contains electodes, electrolyte spaces and channels for the supply of electrolyte, coolant, reactants, etc. Individual cells are formed in this way within the pile, which cells contain a functional positive electrode, an electrolyte space and a functional negative electrode. Such cells may be coupled in parallel in groups, which groups in turn are coupled in series. There are also, of course, other embodiments with cells only coupled in series where the positive electrode in one cell is electrically coupled to the negative electrode in the adjacent cell, etc. More complicated patterns are possible which are determined by the desire to reduce leakage currents in the electrolyte system and to create conditions for special electrical control modes with in-and-out coupling of individual parts of the pile.

Battery designs of this kind are well-known in the state of art and are described for instance in Swedish Pat. No. 217,054.

A battery pile is frequently made up of elements which operate independently of each other (exclusive of the necessary means for electrical and mechanical couplings). It is, however, frequently advantageous to join together the different electrolyte spaces which are formed in the pile so as to produce a common electrolyte system. A common design which is described for instance in the above-named Swedish Pat. No. 217,054 uses one electrolyte channel for incoming electrolyte, which channel is connected to the different electrolyte spaces by means of so-called bi-channels. There is also a channel for outgoing electrolyte to which the different electrolyte spaces are connected in a similar way be means of bi-channels. Electrolyte can be circulated through the different electrolyte spaces in this way from a common separate electrolyte system. This produces a number of advantages, such as for instance, the possibility of temperature control, elimination of concentration differences, purification, etc.

A special embodiment of this kind with a common electrolyte system is described in Swedish Pat. No. 363,193 and is characterized in that the electrolyte is allowed to flow freely out of the pile over a free board instead of by means of a system with bi-channels and a main channel. This embodiment gives great advantages among other things in conjunction with iron air batteries built in pile shape, since the oxygen which is developed during charge can escape freely from the pile.

The present invention is thus concerned with electrochemical power sources which are in principal built as piles and which contain a common electrolyte system for the cells in the pile, whereby the electrical design of the pile is such that the pile contains at least two units or modules which are electrically coupled in series and which units or modules contain at least two cells coupled in parallel. The invention is a remedy to a difficult problem with previously known batteries which have a common electrolyte system for the cells in the battery. The electrolyte system in such previous batteries would connect cell spaces of different potentials which would cause leakage currents in the electrolyte channels. The natural way to reduce leakage currents is to minimize the dimensions of the electrolyte channels. This, however, increases the risk for plugging of the channels with sludge, etc. Therefore one is, in practice, forced to make a compromise between the desire for good electrolyte connections and high resistance in these connections.

The supply of electrolyte to an individual cell space may be cut off by a sludge formation which will shut off, for instance, a bi-channel for the incoming electrolyte even when these channels are comparatively large. Such incidents frequently cause secondary effects. These disturbances can be enhanced for instance because of temperature rises in the cell space in question, because of insufficient cooling which will in turn increase the sludge formation. This in turn can then lead to a situation wherein the electrolyte space looses electrolyte so that a gas space is formed in the electrolyte space. Because of this, electrodes which are still in contact with electrolyte will then take a very strong current load. There is also a risk of formation of incrusts at the interface between the gas phase and the electrolyte phase. These cooperating effects cause failure in one individual cell, whereas other cells are completely intact. This may seem unbelievable with piles which have been built with small tolerances and where the electrodes are of uniform size and quality.

It is therefore an object to provide a novel electrochemical battery which alleviates problems of the type previously described.

It is another object of the invention to provide a novel electrochemical battery which enables cells to be fluidly connected while minimizing potential electrical leakage.

BRIEF DESCRIPTION

According to the present invention it has been found possible to almost eliminate or at least drastically reduce the chances for disturbances of the kind described above in a most simple and surprising manner. The characteristic feature of the invention is that fluid connections or cross-channels are set up between the electrolyte spaces in the cells, which cells being coupled electrically in parallel. The cross-channels are arranged in the lower parts of the electrolyte spaces so that electrolyte can be transferred between these electrolyte spaces by means of such cross-channels.

According to another preferred embodiment, cross-channels are also provided between the electrolyte spaces in the parallelconnected cells in the upper parts of the electrolyte spaces in order to produce a so-called plenum.

THE DRAWING

The invention will now be described in some detail by means of the attached drawing in which:

FIG. 1 shows a longitudinal sectional through a metal air battery, in this case an iron air battery according to the invention, and FIG. 2 shows an air element from the battery in FIG. 1.

DETAILED DESCRIPTION

Figure 1:
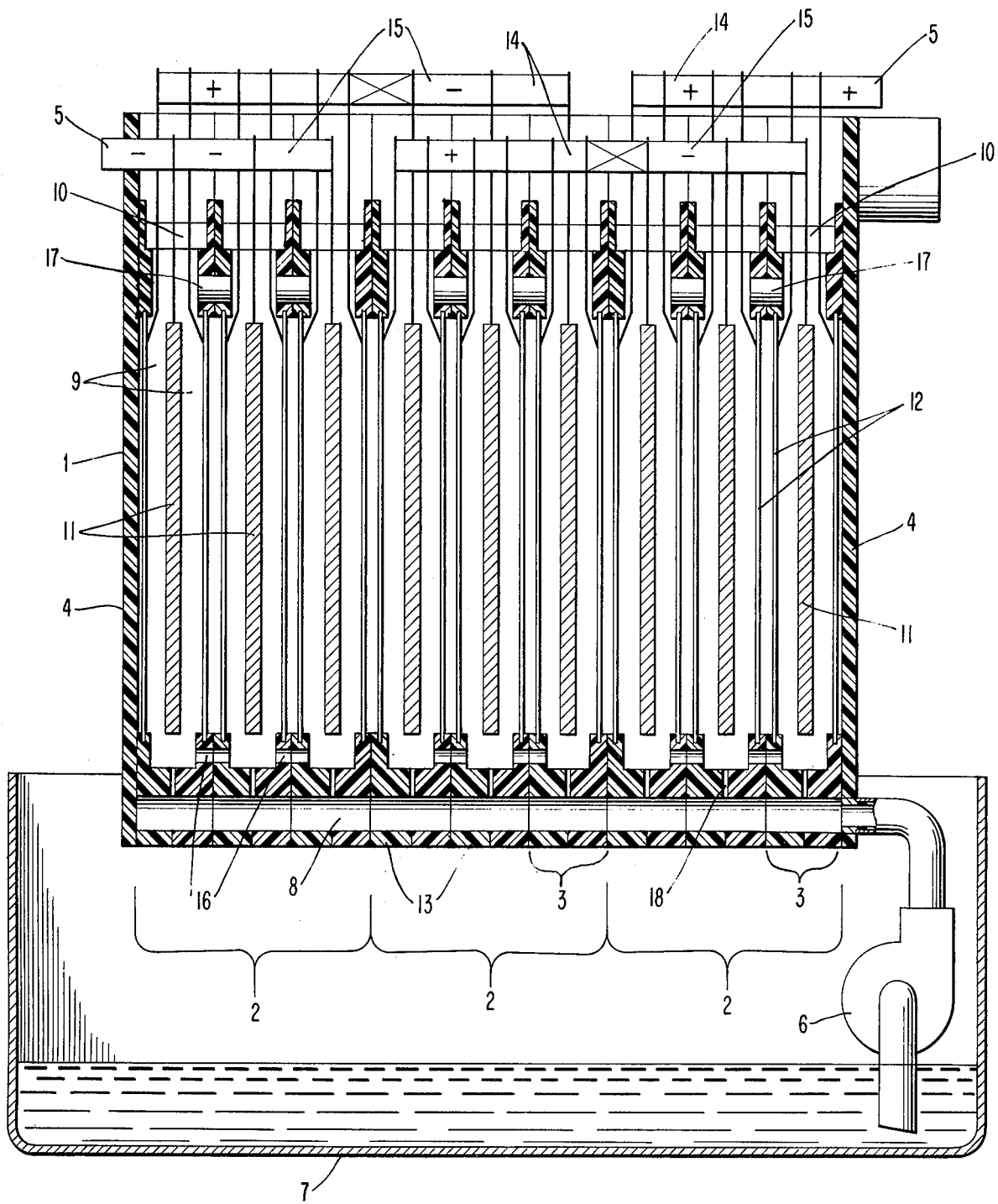

The metal air battery shown in FIG. 1 is built as a pile and contains an electrolyte system of the type which is described in the Swedish Pat. No. 363,193. The pile 1 contains three modules, 2 joined in series. Each module in this preferred case, contains three cell units 3 electrically connected in parallel. The pile is furthermore supplied with end elements 4, and pole bolts 5 and other necessary structure, such as a pump 6 for supplying electrolyte from a vessel 7 to an ingoing electrolyte channel 8. The electrolyte leaves the electrolyte spaces via the free board 10. Since the pile in this case is part of an iron air battery it contains iron electrodes 11 and air electrodes 12, for instance, of the type manufactured according to Swedish Pat. No. 360,952. The air electrodes are mounted in frames 13 so as to form air elements which are joined to form a pile for instance, according to Swedish Pat. No. 349,189.

The positive air electrodes in a module are joined in parallel with current connectors 14. The negative iron electrodes in a module are similarly joined in parallel by means of current connectors 15.

Fluid connections in the form of cross-channels 16 according to the invention have been arranged at the lower parts of the electrolyte spaces. The embodiment shown also exhibits connections 17 which may be optionally arranged in the upper parts of the electrolyte spaces.

The cross-channels 16 thus fluidly interconnect the electrolyte spaces of each module in parallel to enable electrolyte to be transferred between such spaces.

Figure 2:
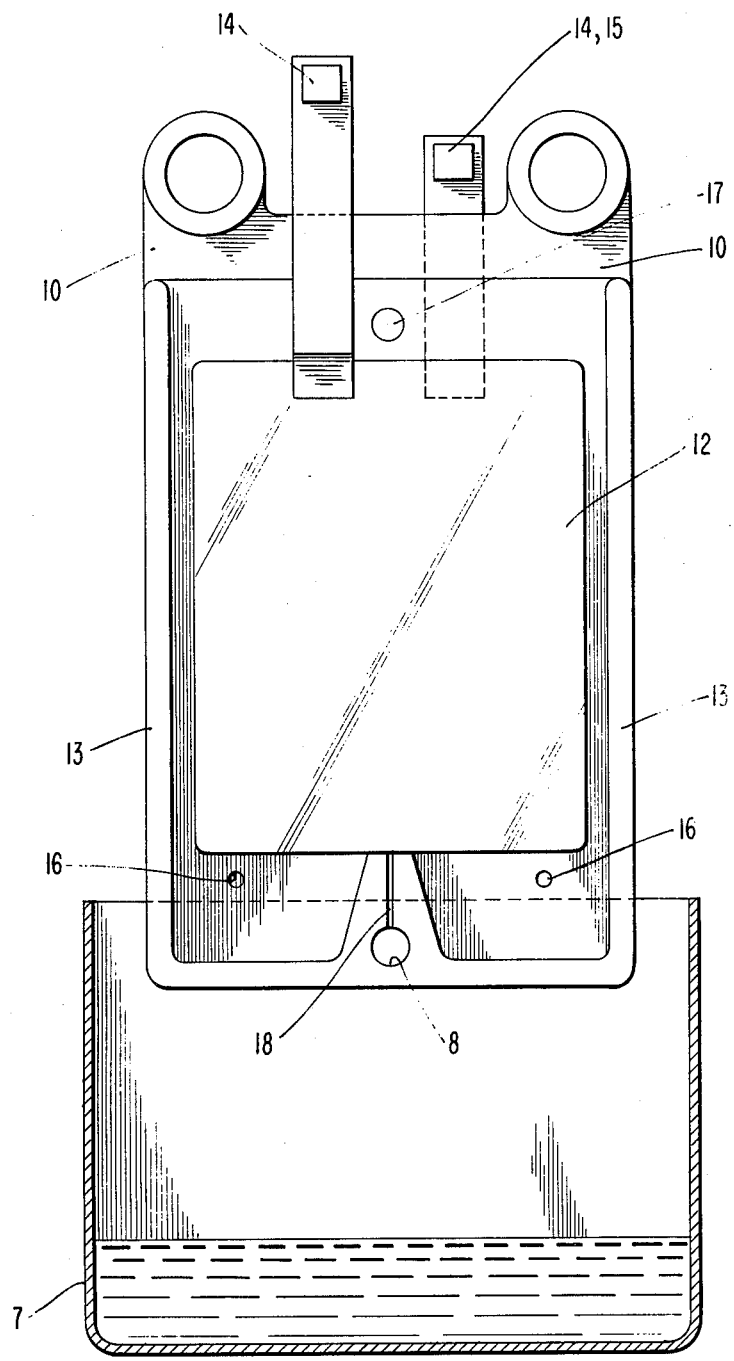

The electrolyte flow in the ingoing electrolyte channel 8 is 0.4 liters per minute for this preferred pile. The electrolyte is distributed between the nine electrolyte spaces by inlet channel portions or bi-channels 18. FIG. 2 shows an air element in the pile 1 and demonstrates how the cross connections 16 and 17, according to the invention, are made in the frame 13. The connections offer only small resistance to liquid flow compared to that offered by the bi-channels. The area of the cross-section of these connections is, in this case, on the order of 50 sq. millimeters and the length is about 5 millimeters, as compared to a cross-section area for the bi-channels 18 of about 2 sq. millimeters and length of about 20 millimeters.

The dimensions of the fluid connections are thus in this case much larger than the dimensions of the bi-channels, which is made possible, among other things, by the fact that there are no problems with leakage current since only electrolyte spaces of the same potential are interconnected. The connections in the lower parts of the electrolyte spaces may preferably be disposed somewhat above the lowest part of the cell space so as to prevent these connections from becoming blocked by sludge accumulations.

Most types of cross-channels 16, 17 can be made quite wide since leakage currents cannot occur between the electrolyte spaces on the same potential. Thanks to these simple measures according to the invention the electrolyte spaces in the parallel-coupled cells will, so to speak, share the functions of the bi-channels which supply electrolyte to each electrolyte space respectively. If one of these bi-channels becomes plugged up, electrolyte will move from the other electrolyte spaces through the special connections.

The effect upon the reliability of the operation can be illustrated by the following very simple example. Assume that the reliability of one bi-channel 18 is 0.99 which means that there is a one percent risk that the electrolyte space in question will suffer a shut-off of electrolyte supply during the time period in question. If there are four electrolyte spaces coupled electrically in parallel and these electrolyte spaces are furnished with cross-channels 16 according to the invention, this risk will be reduced to $10^{-6}$ when contemplating plugging-up of an individual bi-channel 18 by random effects. The cross-channels according to the invention thus improve the reliability of the system drastically.

Regarding the preferred embodiment with the cross-channels 17 in the upper part of the electrolyte space, it should be remarked that the plenum formed thereby is of a specially great value in piles where there occur gases which can leak out in the electrolyte. For instance, leakage might occur through holes in the electrodes of fuel cells or metal air batteries which are supplied with gaseous reactants. A strong gas leakage in such a pile can cause a so-called mammoth pump effect. Even if cross-channels 16 of the present invention are provided at the bottom of the electrolyte spaces, electrolyte can flow through the electrolyte space which contains the leaking electrode and may cause an uneven distribution of the electrolyte flow between the different electrolyte spaces 9. This risk is, however, eliminated by means of the preferred embodiment of the invention where the cross-channels 16 in the lower parts of the electrolyte spaces are supplemented with similar cross-channels 17 in the upper part of the electrolyte space. Since the last mentioned channels 17 are on a level below the outlet for the outgoing electrolyte, preferably as near the level of the outlet as possible, electrolyte may be supplied to the electrolyte space in trouble by means of the upper connection, whereby uneven supply to the different electrolyte spaces is counter-acted.

The invention is, as has been said above, particularly advantageous with metal air batteries, like iron air batteries, zinc chlorine batteries and fuel cell batteries, for instance for hydrogen and air. The invention may, however, also be used with alkaline batteries with circulating electrolyte built in piles or in a way which functionally corresponds to a pile design. It is also of advantage to use the invention, for instance, with lead batteries with circulating electrolyte. There is no difficulty for the artisan knowing the spirit of the invention to design connections according to the invention for different electrochemical power sources containing several cells with a common electrolyte system. Therefore, additions, modifications, substitutions and deletions not specifically described may be made without departing from the spirit and scope of the invention as defined in the appended claims.

What is claimed is:

1. An electrochemical battery comprising:
   frame means;
   at least two modules mounted in said frame means electrically interconnected in series, each module containing at least two cells electrically connected in parallel, each cell comprising:
   at least one positive electrode,
   a negative electrode, and
   an electrolyte space therebetween; and
   an electrolyte supply bi-channel connected to each electrolyte space independently of an adjacent space to supply each electrolyte space individually with electrolyte from a source of electrolyte, the electrolyte spaces of each module being interconnected fluidly in parallel at their lower ends by cross-channels to enable electrolyte to be transferred between said spaces.

2. A battery according to claim 1 wherein said electrolyte spaces are further interconnected fluidly in parallel at their upper ends by additional cross-channels.

3. A battery according to claim 1 wherein said electrolyte supply bi-channels include inlet portions leading into respective ones of said electrolyte spaces, said cross-channels being larger in cross-sectional dimension that said supply bi-channel inlet portions to present sufficiently less resistance to liquid flow than that presented by said supply bi-channel inlet portions.

* * * * *